Feb. 17, 1970          A. F. HICKMAN          3,495,848
SPRING SUSPENSION FOR VEHICLE AXLE
Filed May 25, 1967          3 Sheets-Sheet 2

INVENTOR.
Albert F. Hickman
BY
Popp and Sommer
ATTORNEYS.

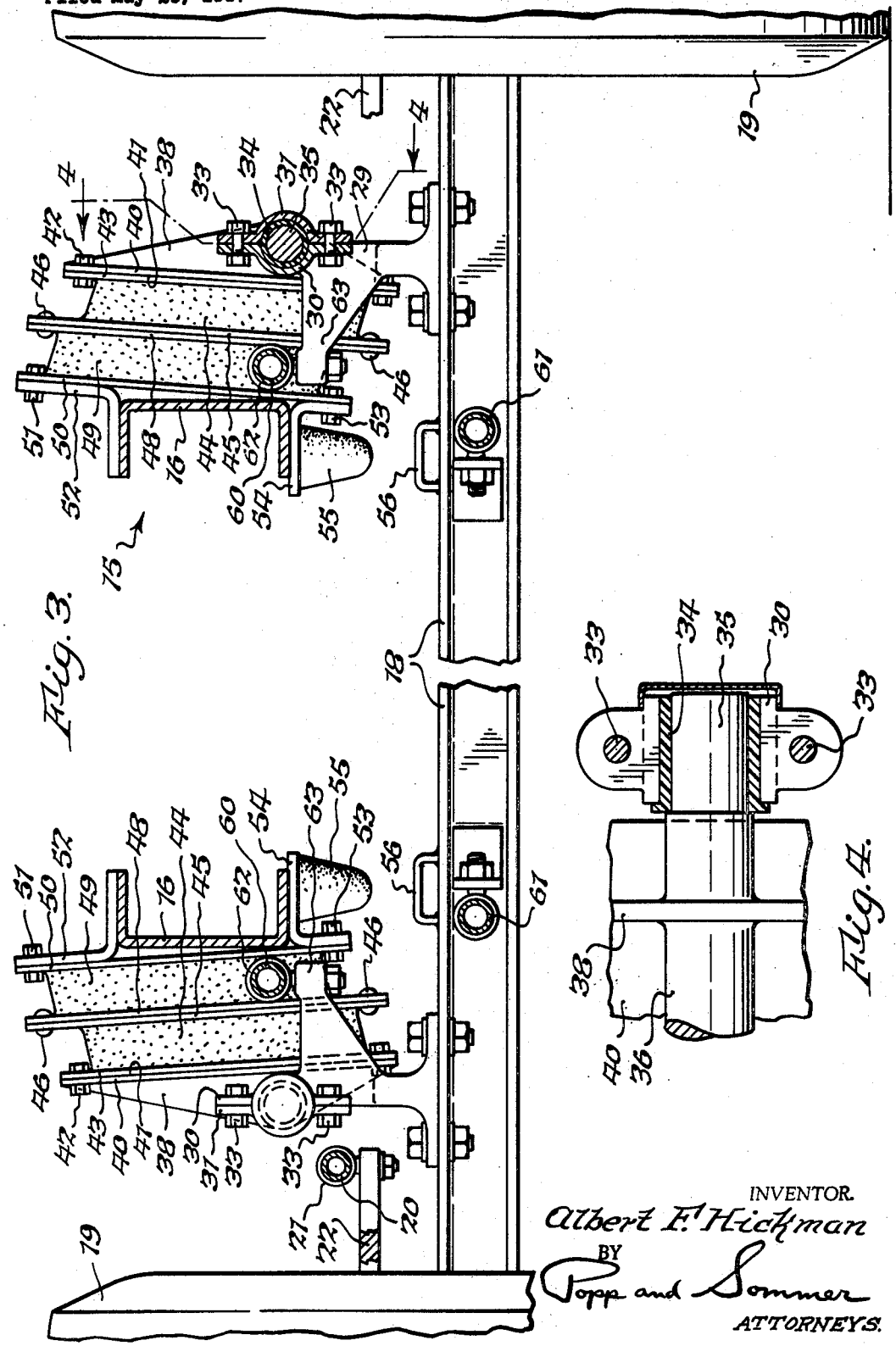

United States Patent Office 3,495,848
Patented Feb. 17, 1970

3,495,848
SPRING SUSPENSION FOR VEHICLE AXLE
Albert F. Hickman, 8009 N. State Road,
Eden, N.Y. 14057
Filed May 25, 1967, Ser. No. 641,234
Claims priority, application Great Britain, June 16, 1966,
26,834/66
Int. Cl. B60g 11/22
U.S. Cl. 280—124         5 Claims

ABSTRACT OF THE DISCLOSURE

The suspension is between a vehicle frame and a full, or single continuous axle beam thereunder, the opposite ends of which project outwardly from the opposite sides of the frame and are supported by rubber tired wheels. The suspension comprises at least one upright flexible rubber body above each axle end and between the adjacent wheel and side of the frame and having an inner upright face fast to the side of the frame and an outer upright face fast to a backup plate, these faces extending lengthwise of the line of vehicle travel. A pivot joint, working on a horizontal axis also lengthwise of such line of travel, is located at the bottom of each backup plate proximate the companion wheel, and connects each backup plate with the adjacent axle beam end, these pivot joints both oscillating to transmit upward movement of either end of the axle beam to the companion backup plate to impose vertical rectilinear shear action upon the companion rubber today. Desirably the outer faces of the rubber bodies converge downwardly toward the center of the frame to provide compressive action by the backing plates against the rubber bodies.

---

Important objects are to provide, within the limited space available, such a suspension which will permit the large amount of vertical axle movement to provide a low frequency ride as soft as load heights will allow; which provides resiliently resisted vertical, vertical angular, and a slight amount of longitudinal and lateral axle movement with reference to the frame; for which no lubrication is required; which permits the steering wheels to be manually turned but substantially prevents any steering movement as a consequence of the vertical, lateral, angular or longitudinal movement of the front axle with reference to the vehicle frame; which will stand up for many years and miles of use without servicing; in which the frame is cradled at widely spaced points to reduce frame stresses; which is light in weight, particularly unsprung weight; which is free from friction but can be controlled by an increasing resistance in proportion to amplitude and velocity of vertical frame movements; which permits full steering of the wheels in making short turns; which provides a much wider spring base than that provided by conventional leaf springs; which renders auxiliary sidesway control devices, such as torsion bar stabilizers, unnecessary; in which periodic vibration and wheel tramp is avoided; which is low in cost; and in which bond stress of the rubber bodies is kept within safe working limits.

A specific object as compared with patented shear rubber rectilinear movement wheel spring suspensions is to reduce the number of shear rubber rectilinear springs required; to greatly simplify the construction and reduction in cost; and at the same time preserve all of the above fundamental features and advantages.

Figure 1:
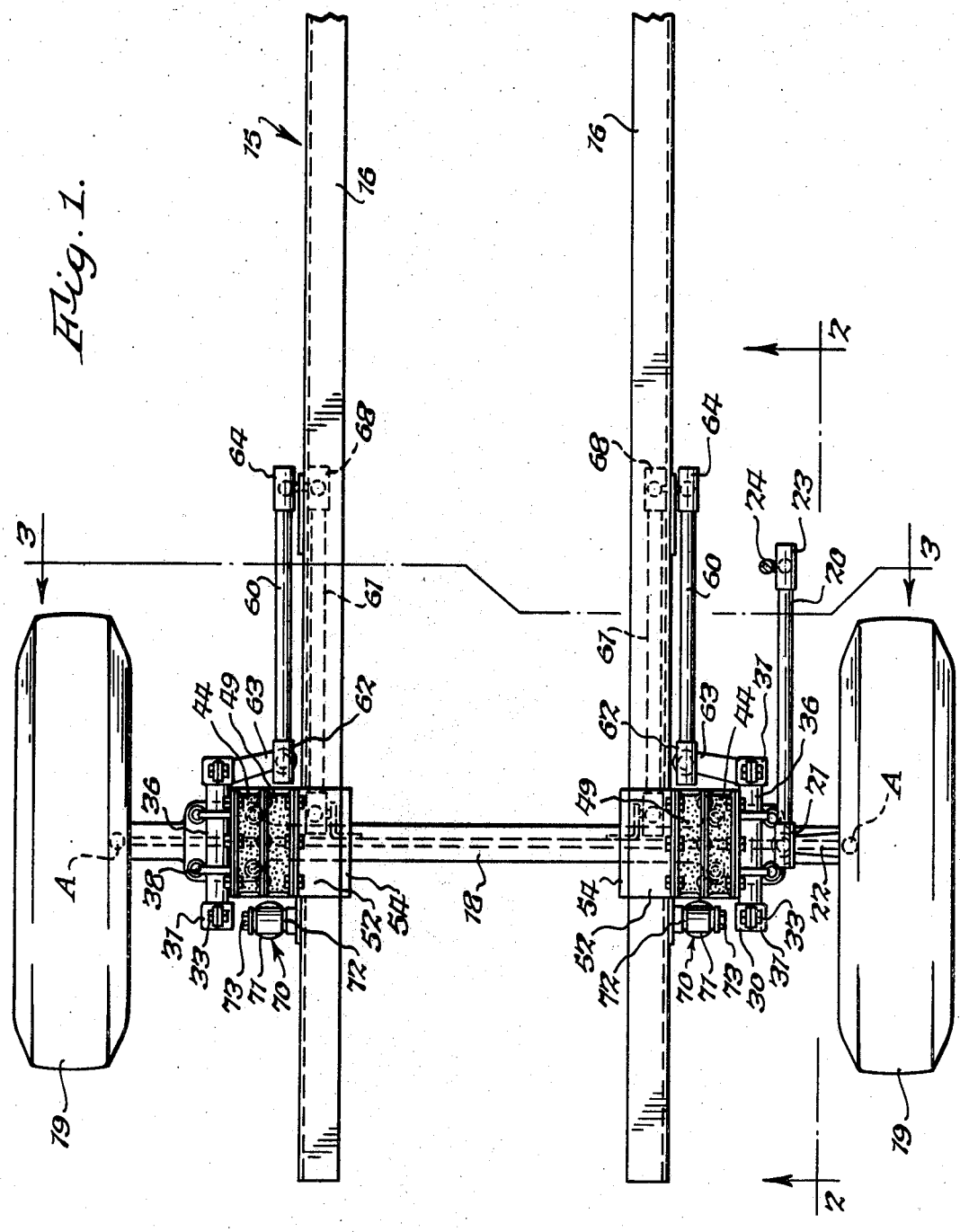
Figure 2:
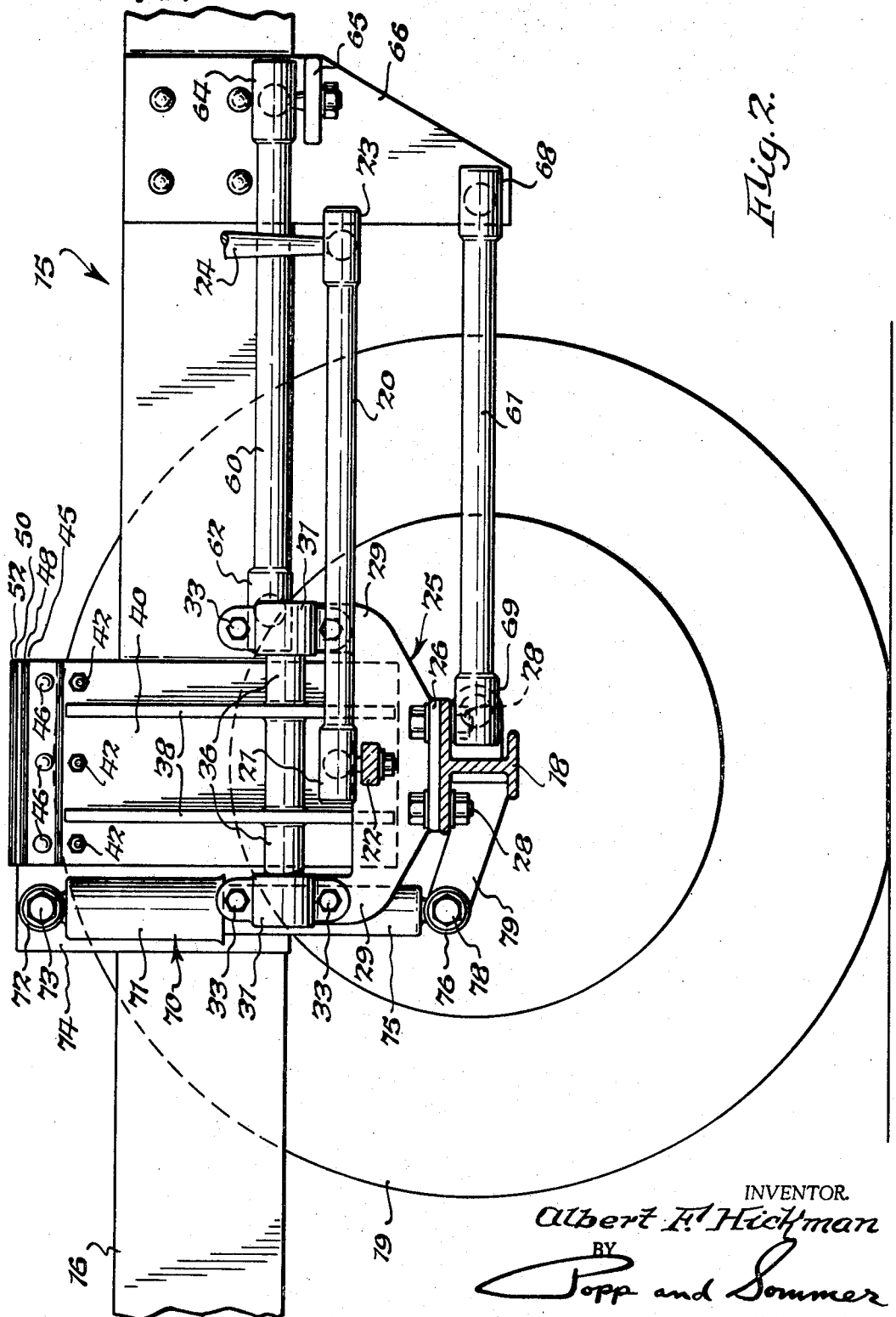

In the accompanying drawings: FIG. 1 is a fragmentary top plan view of the front end of a vehicle chassis or frame supported on a front steering axle and steering wheels by a spring suspension embodying the present invention. FIG. 2 is an enlarged fragmentary vertical longitudinal section taken generally on line 2—2, FIG. 1. FIG. 3 is a fragmentary enlarged transverse section taken generally on line 3—3, FIG. 1. FIG. 4 is a further enlarged fragmentary vertical longitudinal section taken generally on line 4—4, FIG. 3.

The main frame 15 of the vehicle can be of any suitable construction and is shown as comprising a pair of main longitudinal horizontal side frame channel bars 16 which can be connected by the usual cross bars (not shown). The entire vehicle chassis, together with the present spring suspension, is constructed substantially symmetrically about a vertical longitudinal medial plane, and hence it is deemed sufficient to confine the following description generally to the one (left) side of the vehicle, it being understood that this description and the same reference numerals apply to the opposite (right) side of the vehicle.

The front end of the frame 15 is supported on a front steering axle 18 in the form of an I-beam. Each end of this axle is supported by a front steering wheel 19 which is moved by any conventional form of steering gear about an upright axis A shown in FIG. 1. The specific form of this steering gear is of no consequence so far as the present invention is concerned and the only part illustrated is the convention steering drag link 20, the front end of which is connected by the usual ball and socket joint 21 with the actuating arm 22 of the stub shaft (not shown) for the adjacent wheel and the rear end of which steering drag link 20 is connected by the usual ball and socket joint 23 to the lower end of the usual actuating arm 24 which is pivoted on the frame for fore-and-aft movement. The actuating arm 22 for the two steering wheels can be cross connected by convention linkage (not shown) to cause the wheels to steer in unison.

Mounted on each end of the steering axle 18 in the space between the wheel 19 and frame 15 is an axle bracket 25 having a base part 26 secured by bolts 28 to the axle and a pair of arms 29 projecting fore-and-aft with reference to the vehicle and each terminating in an upwardly projecting horn forming coaxial half bearing housings 30. The companion half bearing housings 31 are secured to the axle bracket arms 25 by pairs of horizontal bolts 33 to embrace nylon bushings 34. These nylon bushings embrace stub shafts 35, these stub shafts at each axle end projecting coaxially fore-and-aft from the ends of an integral cylindrical hub 36 in turn formed integrally with outwardly projecting vertical reinforcing flanges 38 of an outer rectangular metal backup plate 40.

These outer backup plates 40 swivel, of course, about the axes of their horizontal fore-and-aft bearing stub shafts 35 and have inner flat faces 41 which oppose the frame 15 and are disposed at the angle shown in FIG. 3, namely, at about a 3° inclination from the vertical, inclining downwardly and inwardly.

Secured by four corner bolts 42 to each outer backup plate 40 is an outer sheet metal plate 43 to the opposite face of which is vulcanized a rectangular shear rubber rectilinear movement rubber body 44. The opposite or inner face of this rubber body is vulcanized to another rectangular sheet metal plate 45 secured by corner rivets 46 to the outer face of a similar sheet metal plate 48. To the opposite or inner face of this last sheet metal plate is vulcanized another rectangular shear rubber rectilinear movement rubber body 49. The opposite or inner face of this last rubber body is vulcanized to a fourth rectangular sheet metal plate 50.

The top of each rectangular sheet metal plate 50 is secured by corner bolts 51 against the outer face of the upstanding flange of a top frame angle bracket 52 welded to the top flange of the corresponding main longitudinal side frame bar 16. The bottom of each rectangular sheet metal plate 50 is secured by corner bolts 53 against the outer face of the depending flange of a bottom angle bracket 54 welded to the bottom flange of the corresponding main longitudinal side frame bar 16. The outer faces of these frame angle brackets 52, 54 at each axle end are arranged in a fore-and-aft plane which inclines downwardly and inwardly, as shown in FIG. 3.

Each bottom frame angle bracket 54 also is shown as carrying a depending rubber bumper 55 positioned to engage a raised seat 56 on the axle when the suspension bottoms.

The suspension also includes radius rods 60, 61 in parallelogram arrangement in vertical fore-and-aft planes at opposite ends of the axle 18. The forward end of each top radius rod 60 is connected by a ball and socket joint 62 to the extremity of an arm 63 projecting horizontally upwardly, toward the frame 15, from the upright horn forming the rear half bearing housing 30 of the axle bracket 25. The rear end of each top radius rod is suitably secured by a ball and socket joint 64 to a flange 65 projecting horizontally outwardly from a frame bracket 66 which is secured to and projects downwardly from the corresponding main longitudinal side frame bar 16.

The rear end of each bottom radius rod 61 is secured by a ball and socket joint 68 to the bottom of each frame bracket 66 and its front end is connected by a ball and socket joint 69 to the corresponding end of the axle 18.

A telescopic shock absorber 70 is shown as disposed vertically in front of each rubber spring unit with its upper telescoping section 71 pivotally secured, preferably through a rubber bushing 72, to a pivot bolt 73 projecting horizontally outwardly from the top of a vertical frame bracket plate 74 welded to the adjacent main longitudinal side frame bar 16. The bottom telescoping section 75 is pivotally secured, preferably through a rubber bushing 76, to a pivot bolt 78 carried by a forwardly projecting arm 79 fixed to the adjacent end of the axle 18.

In the operation of the suspension the upward movement of one end of the steering axle 18, through the corresponding axle bracket 25, moves the corresponding backup plate 40 upwardly. It is an important feature of the invention that this movement is permitted by the slight turning of the stub shafts 35 in the nylon bushings 34 of the two coaxial half bearings 30, 31 carried by the front and rear extremities or arms 29 of the axle bracket 25. This stresses upwardly the outer portions of the rubber bodies 44, 49 hence distorting these rubber bodies or blocks upwardly. This upward force impressed upon these rubber bodies 44, 49 is transmitted through the frame brackets 52, 54 to the frame 15.

It will be seen that each of the rubber bodies 44, 49 at each end of the axle are stressed upwardly in providing a resilient support for the corresponding side of the frame 15, each of these rubber bodies having a rectilinear shear movement. It will further be seen that each pair of rubber bodies 44, 49 are in series thereby to provide the large amount of movement necessary to provide a vertical ride as soft as possible and at a low frequency at the front or steering end of the truck.

A further feature of the suspension is that in addition to providing resilient resistance to vertical movement, the rubber bodies 44, 49 also provide such limited resilient resistance to horizontal movement of the axle 18 lengthwise of the vehicle 18 as permitted by the ball and socket joints 62, 64, 68 and 69 (which can be rubber bushed for this purpose) and also permit a limited movement of the axle 18 transversely of the vehicle by virtue of the slight compression of the rubber blocks 44, 49.

Since the rubber blocks or bodies 44, 49 are interposed between the opposed upwardly diverging parallel surfaces of the backup plates 40 and frame brackets 52, 54, it will be seen that upward movement of the backup plates effects a wedging action on these rubber bodies 44, 49. This wedging action increases as the load increases and greatly increases the load capacity of the rubber bodies vulcanized to their metal plates 43, 45, 48 and 50 and eliminates bond stress and the necessity of adjusting a means between the springs. It also improves the resistance curves of the springs. The resistance increases through compression of the rubber bodies as the deflection increases.

The so-called steering geometry is not affected in any substantial degree by movement of the axle 18 in any direction, this being a most important safety factor. Thus, with the suspension shown, substantially no steering movement of the wheels 19 takes place as a consequence of axle movement.

The compactness and position of the rubber spring unit at each end of the steering axle also permits the unit to be interposed between the frame and corresponding steering wheel and still not interfere with movement of the steering wheel in making very short turns.

It will also be noted that the suspension has high and wide spring centers provided by the stub shafts 35, thereby to provide a high degree of sidesway control.

By "rubber" as used in the accompanying claims is meant natural rubber and also synthetic rubber and also mixtures of natural and synthetic rubber.

I claim:

1. A vehicle spring suspension adapted to be interposed between a vehicle frame structure and an axle structure which axle structure comprises a single continuous axle beam extending across, and the opposite ends of which project outwardly from opposite sides of, said frame structure, and are supported on rubber tired wheels: wherein the improvement comprises an upright flexible rubber body arranged above each end of said single continuous axle beam between the corresponding wheel and side of said frame structure and having opposite upright faces arranged generally parallel with the line of travel of the vehicle, a plate fast to one of said faces, means securing said plate to one of said structures, a backup plate fast to the other of said faces, a pivot joint working on a generally horizontal axis extending lengthwise of said line of travel of the vehicle and arranged adjacent the bottom of each backup plate proximate the adjacent wheel and pivotally connecting such backup plate with the other of said structures whereby vertical movement of one end of said single continuous axle beam relative to its other end effects oscillation of both of said pivot joints and upward rectilinear shear distortion of the rubber body at said one end of said single continuous axle beam.

2. A vehicle spring suspension as set forth in claim 1 wherein said other face of each rubber body fast to the corresponding backup plate is at an acute angle to the vertical and in a plane intersecting a vertical plane through the said axis of said pivot joint whereby upward movement of each end of said single continuous axle beam, through the corresponding pivot joint and backup plate acts to press the corresponding rubber body against its first mentioned plate.

3. A vehicle spring suspension as set forth in claim 1 wherein each pivot joint comprises a pair of axially spaced bushing members composed of an organic plastic such as nylon and each surrounding a pivot pin.

4. A vehicle spring suspension adapted to be interposed between a vehicle frame and an axle comprising a single continuous axle beam extending across, and the opposite ends of which project outwardly from opposite sides of, said frame and are supported on rubber tired wheels: wherein the improvement comprises an upright flexible rubber body arranged above each end of said single continuous axle beam between the corresponding wheel and side of said frame and having an inner upright face opposing said frame and an outer upright face opposing the wheel, a plate fast to said inner face, frame bracket means securing said plate to the corresponding side of said frame, a backup plate fast to said outer upright face, a pivot joint working on a generally horizontal axis extending lengthwise of the line of travel of the vehicle and arranged adjacent the bottom of each backup plate proximate the corresponding wheel and pivotally connecting such backup plate with the adjacent end of said single continuous axle beam whereby vertical movement of one end of said single continuous axle beam relative to its other end effects oscillation of both of said pivot joints and upward rectilinear shear distoration of the rubber body at said one end of said single continuous axle beam and whereby such location of said pivot joints provide high and wide supporting spring centers and a high degree of sidesway control.

5. A vehicle spring suspension as set forth in claim 4 wherein said inner and outer faces of the rubber bodies at opposite ends of said single axle beam converge downwardly toward the center of the frame whereby upward movement of each end of said single continuous axle beam acts to press the corresponding rubber body between its said first mentioned plate and back-up plate.

References Cited

UNITED STATES PATENTS 2,836,413   5/1958   Hirst.
2,199,896   5/1940   Siebler.

PHILIP GOODMAN, Primary Examiner

U.S. Cl. X.R.

267—21